United States Patent [19]

Gunther

[11] 3,739,908
[45] June 19, 1973

[54] TESTING APPARATUS AND METHOD FOR SCREW-LIKE ITEMS

[75] Inventor: James C. Gunther, Greensburg, Pa.

[73] Assignee: Robertshaw Controls Company, Richmond, Va.

[22] Filed: Nov. 16, 1971

[21] Appl. No.: 199,242

[52] U.S. Cl. .......................... 209/75, 209/80, 209/82
[51] Int. Cl. ............................................. B07c 5/06
[58] Field of Search .................. 209/75, 80, 82, 88; 33/174 L

[56] References Cited
UNITED STATES PATENTS

| 2,111,252 | 3/1938 | Summers | 209/82 |
| 2,354,419 | 7/1944 | Lingerfelt | 209/75 |
| 2,390,012 | 11/1945 | Timm | 209/88 R |

Primary Examiner—Richard A. Schacher
Attorney—Auzville Jackson, Jr. et al.

[57] ABSTRACT

Apparatus for automatically and serially testing screw or rivet items each having a head and a shank portion, the apparatus having a rotatable table carried by a frame for serially moving the items through a plurality of testing stations of the apparatus. A plurality of testing devices are carried by the frame so as to be located adjacent the table and respectively at the stations to test the items as the table moves the items respectively to the stations where the devices are located. One of the devices has means for testing for maximum overall length of the items. Another of the devices has means for testing for minimum overall length of the items.

16 Claims, 9 Drawing Figures

TESTING APPARATUS AND METHOD FOR SCREW-LIKE ITEMS

BACKGROUND OF THE INVENTION

When utilizing automatic assembly equipment in manufacturing various devices, apparatus has been provided for automatically inserting and threading screw-like items in place.

In order to insure that the screw items being fed to such automatic assembly apparatus are of the proper size in the overall length thereof, in the shank and head diameters thereof, in the shank and head lengths thereof, and that the slot in the head of the screw items is of the proper depth and of the proper configuration, supplies of such screw-like items have to be properly stored and tested so that the same when utilized in the automatic assembling apparatus will be of the proper dimensions and will not only produce properly assembly devices, but also will not damage the automatic assembly apparatus using the screws because of improper dimensions thereof.

SUMMARY

This invention provides a testing apparatus and method for automatically testing screw-like items so that only the proper size screw-like items will be separated out from a supply thereof for subsequent use, such as for use in the aforementioned automatic assembly apparatus or the like in making various devices.

In particular, one embodiment of this invention provides an apparatus for automatically and serially testing screw or rivet items each having a head and a shank portion, the apparatus comprising a rotatable table means that is carried by a frame means of the apparatus for serially moving the items through a plurality of testing stations of the apparatus. A plurality of testing devices are carried by the frame means so as to be located adjacent the table means and respectively at the stations to test the items as the table means moves the items respectively to the stations where the devices are located. One of the devices has means for testing for maximum overall length of the items. Another of the devices has means for testing for minimum overall length of the items. A hopper means is carried by the frame means for serially feeding the items from a supply thereof to the table means. The hopper has means for separating out items that are generally too long in the shank length thereof before the items reach the table means. The hopper means also has means for separating out items that are generally too long in the head height thereof before the items reach the table means. Another of the testing devices of the apparatus has means for testing for maximum and minimum diameter of the shank portions of the items at a station of the table means. Another of the testing devices at the table means has means for testing for maximum diameter of the heads of the items. Another of the testing devices at the table means has means for testing for slot configuration in the heads of the items when the items are screw-like items as well as for testing for the minimum depth of such slot.

Accordingly, it is the object of this invention to provide a testing apparatus for screws or the like with such apparatus having one or more of the novel features set forth above or hereinafter shown or described.

Another object of this invention is to provide an improved method for testing screw-like items or the like, the method of this invention having one or more of the novel features set forth above or hereinafter shown or described.

Other objects, uses and advantages of this invention are apparent from the description of the invention which proceeds with reference to the accompanying drawings wherein:

BRIEF DESCRIPTION OF THE DRAWINGS

The accompanying drawings illustrate an embodiment of the invention, in which.

DESCRIPTION OF ILLUSTRATED EMBODIMENT

Figure 1:
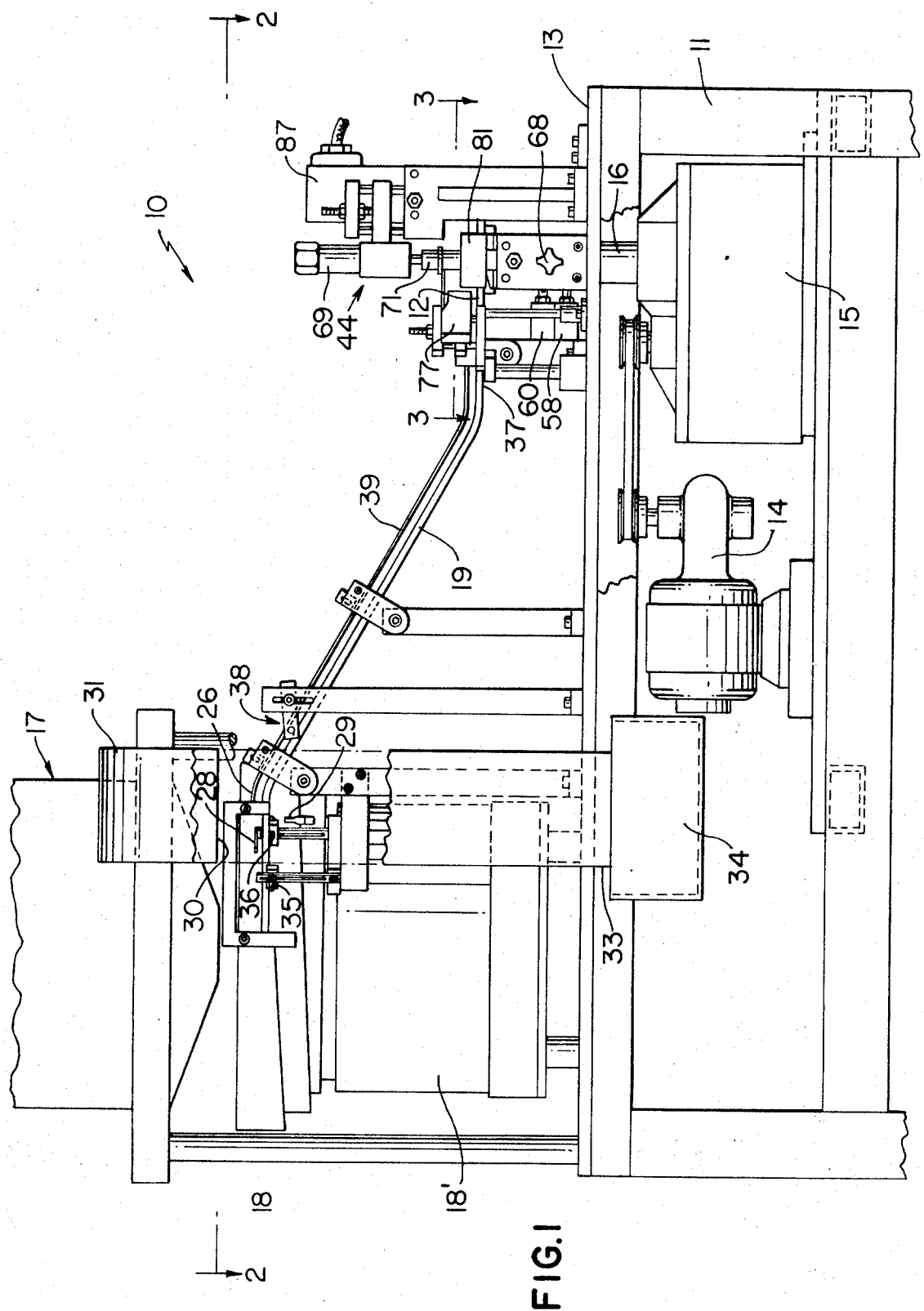
FIG. 1 is a side view, partially broken away, of the testing apparatus of this invention.

While the various features of this invention are hereinafter described and illustrated as being particularly adapted to provide a testing apparatus for screw items, it is to be understood that the various features of this invention can be utilized singly or in any combination thereof to provide testing apparatus for other devices as desired.

Therefore, this invention is not to be limited to only the embodiment illustrated in the drawings, because the drawings are merely utilized to illustrate one of the wide variety of uses of this invention.

Figure 2:
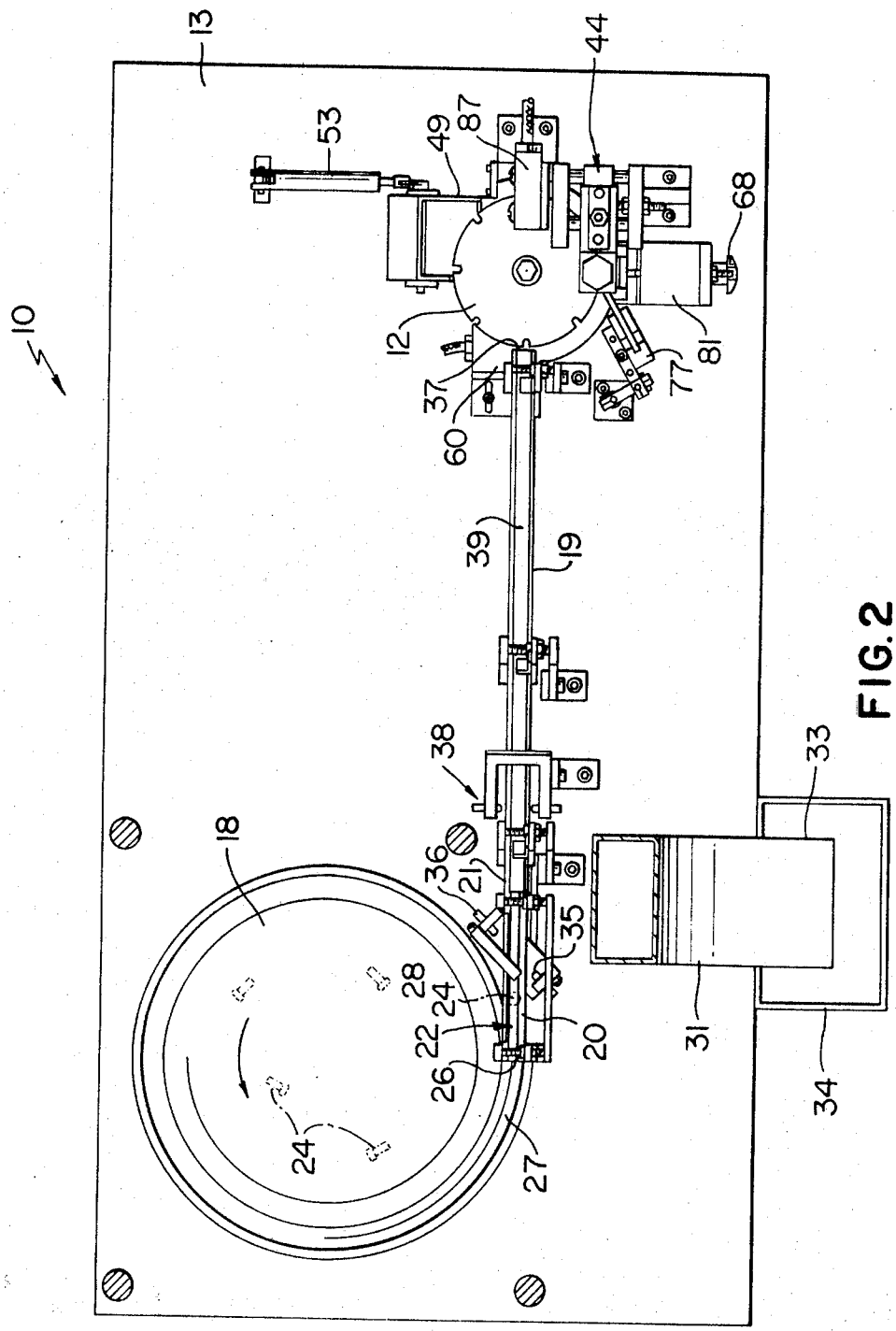
FIG. 2 is a cross-sectional view taken on line 2—2 of FIG. 1.

Referring now to FIGS. 1 and 2, the apparatus and method of this invention is generally indicated by the reference numeral 10 and comprises a frame means 11 supporting a rotatable table 12 above an upper platform 13 thereof and being adapted to be rotated in an indexing manner by a suitable drive motor 14 interconnected to the table 12 through a suitable transmission 15 that has its output shaft 16 coupled to the table 12 to rotate the same in an intermittent indexing manner even though the drive motor is continuously operating.

The frame means 11 supports a rotatable hopper means 17 which is in bowl form for receiving a supply of screws or rivets in the interior 18 thereof to be individually separated and directed out of the hopper 17 into a slide track 19.

In particular, the slide track 19 comprises a pair of rail members 20 and 21 disposed in side by side relation to define a slot 22 therebetween which can receive the shank portion 23 of the item 24 therebetween while permitting the enlarged head 25 of the item 24 to rest on top of the rails 20 and 21 and thereby be supported thereon. Thus, the items 24 can slide along or be pushed along the slot 22 of the track 19 as will be apparent hereinafter.

The left-hand end 26 of the slide track 19 is disposed in aligned relation with an outer groove 27 of the bowl 18 of the hopper 17 so as the hopper 17 is being rotated in a counterclockwise direction in FIG. 2 and is being vibrated by a suitable drive mechanism 18', FIG. 1, in a conventional manner, the supply of items in the bowl 18 is separated so that the same are serially fed along the groove 27 into the end 26 of the track 19 where the items 24 are fed from the left-hand end 26 thereof down the track 19 to the table 12 in a serial manner for the testing purposes thereon hereinafter described.

As the items 24 are fed along the groove 22 of the track 19 from the left-hand end 26 thereof the head height of the items 24 is tested by a contact sensor or wiper 28 that is arranged over the groove 22 so as to be at a height from the track 19 that would be the maximum acceptable height for the head 25 of each item 24 so that if the head 25 of a particular item 24 passing beneath the contact wiper 28 actually makes contact therewith, such actuation of the contact wiper 28 causes an air jet nozzle 29, FIG. 1, to send a blast of air upwardly through the groove 22 between the rails 20 and 21 and blow the defective item 24 upwardly out of the track 19 and into an open end 30 of a chute 31 which has its other end 33 disposed in alignment with a reject hopper 34 so that such rejected item 24 is automatically removed from the track 19 of the hopper means 17 before the same reaches the table 12.

In somewhat of a like manner the shank length of the items 24 is tested at the left-hand end 26 of the track 19 by a pair of photocells 35 and 36 that are carried by the frame means 11 and are arranged below the rails 20 and 21 of the track 19 in such a manner that if the shank portion 23 of a particular item 24 is longer than the acceptable maximum length thereof, the photocell means 35, 36 will also actuate the air nozzle 29 to blow such defective item 24 upwardly out of the track 19 and into the reject chute 31 so that the rejected item 24 is completely removed from the track 19 before the same would reach the table 12.

Thus, it can be seen that the contact wiper 28 and the photocell means 35, 36 check for the maximum permissible lengths of the heads 25 and shanks 23 of the items 24 before the same reach the table 12 and cause automatic sorting out of the items 24 that are defective in the maximum permissible head height and shank length thereof.

After the items 12 have passed the inspection of the devices 28, 35, 36, the same are fed by gravity down the tract 19 to the table 12 which will serially remove the items 24 at the right-hand end 37 of the track 19 at a rate substantially slower than the rate that the hopper 17 can feed such items 24 into the track 19 even through the table is removing items 24 from the track 19 at a rate of approximately 120 per minute. Thus, a photocell arrangement 38 is carried by the frame means 11 adjacent the track 19 downstream from the other photocell arrangement 35, 36, and before the table 12 so that should the track 19 fill up with items 24 from the table 12 back to the photocell arrangement 38, the photocell arrangement 38 will terminate the operation of the hopper means 17 until after the supply in the track 19 again falls below the photocell 38.

In order to hold the items 24 in the track 19 after the same have passed beyond the air jet nozzle 29 because the same have acceptable head and shaft lengths, a top cover or guide 39 is provided above the rails 20 and 21 to hold the items 24 within the track 19.

Figure 3:
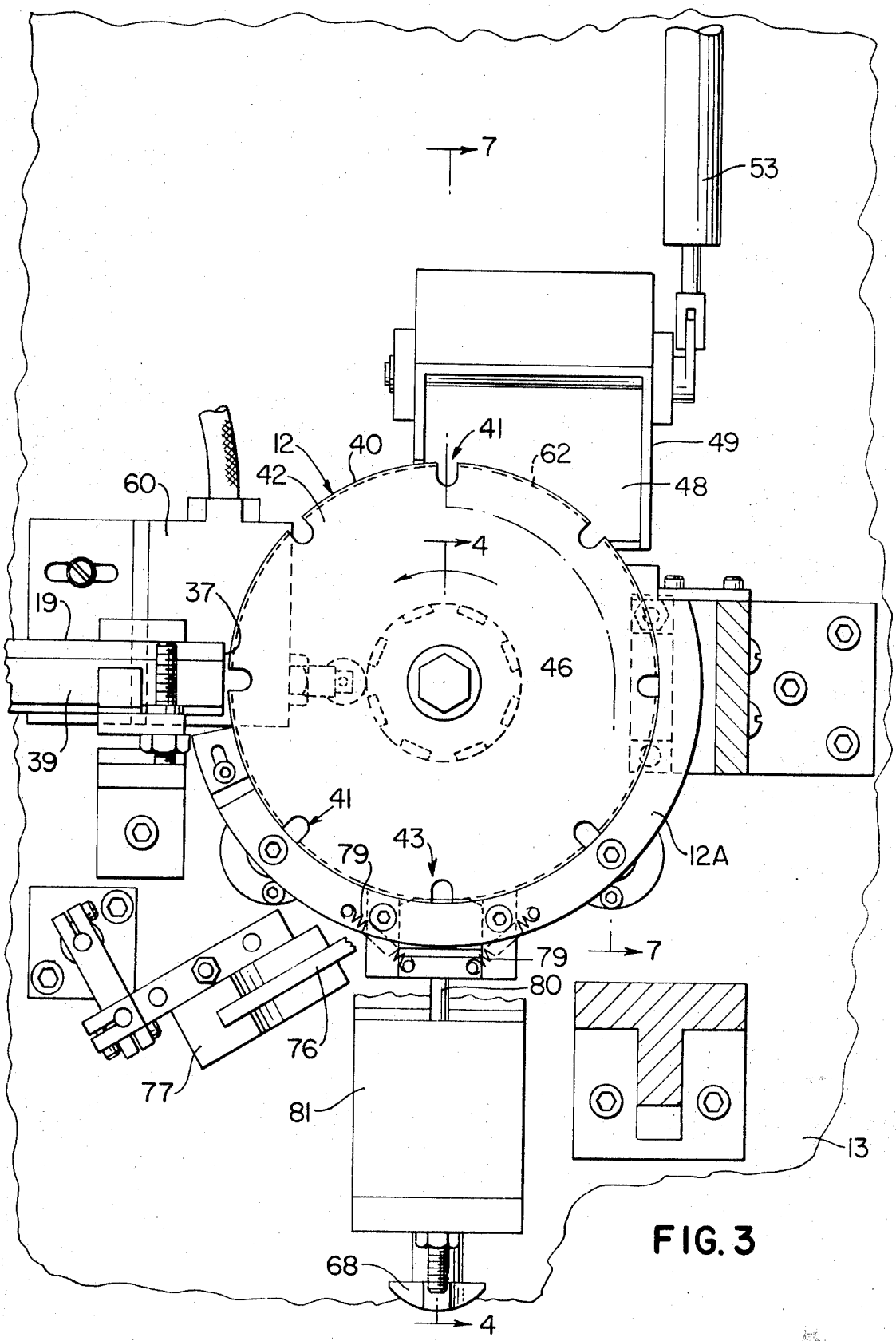
FIG. 3 is an enlarged, fragmentary, cross-sectional view taken on line 3—3 of FIG. 1.
Figure 4:
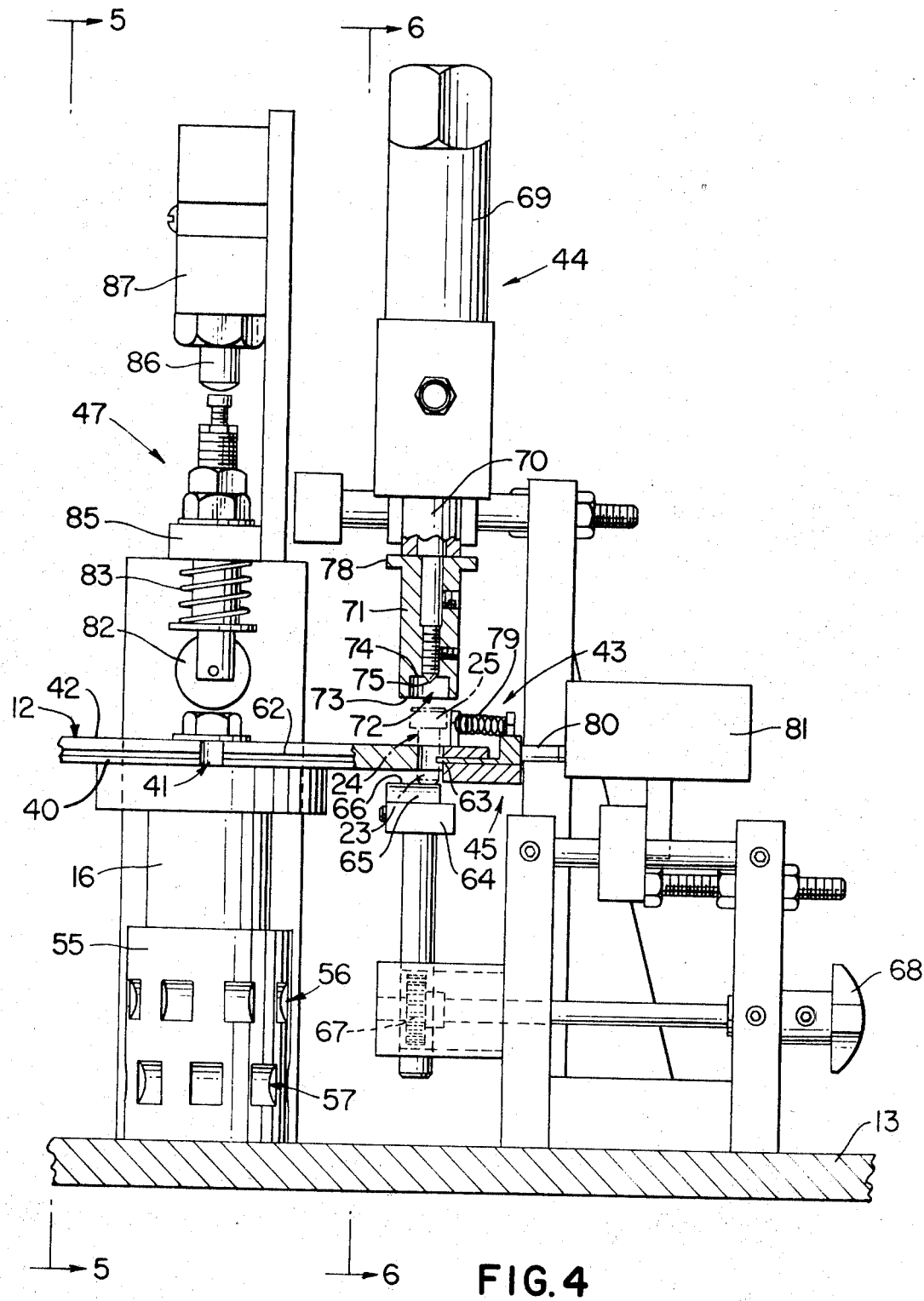
FIG. 4 is a fragmentary, cross-sectional view taken on line 4—4 of FIG. 3.

The rotatable table 12 is best illustrated in FIGS. 3 and 4 and has an outer circular periphery 40 interrupted by a plurality of radially disposed and equally spaced notches 41 which are each of a size that is adapted to receive the shank portion 23 of an item 24 therein while having the head 25 of the item 24 rest on the top surface 42 of the table 12 so as to permit the thus received item 24 to be indexed in a counterclockwise direction in FIG. 3 from the end 37 of the track 19 to a first testing station 43 where not only is the overall maximum length of the item 24 checked by a testing device 44, but also the minimum and maximum diameter of the shank portion 23 of the item 24 is tested by a test device 45. As will be apparent hereinafter, the testing device 44 is also utilized for testing for the maximum outside diameter of the head 25 of the item 24 as well as the minimum depth of any slot in the head 25 thereof when the item 24 is a screw item. The device 44 is also adapted to test the configuration of such slot, such as a slot having a "Phillips" configuration or other as desired. The table 12 is also adapted to be indexed to another testing station 46 where another testing device 47 of this invention is adapted to test for the minimum overall length of the item 24.

In order to hold the items 24 in the notches 41 of the table 12 while the table is being rotated from the end 37 of the track 19 to the station 46, an arcuate member 12A is carried by the frame means 11 and has its inner edge disposed closely adjacent the outer periphery 40 of the table 12 as illustrated.

Figure 7:
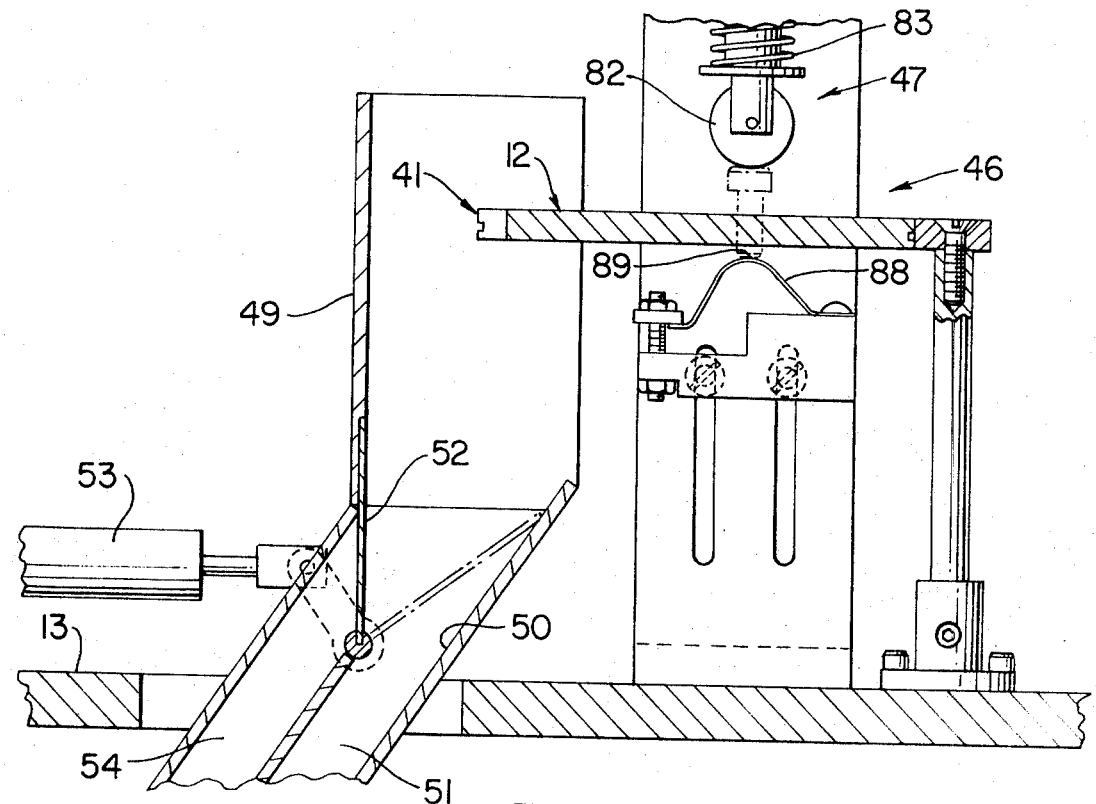
FIG. 7 is a fragmentary, cross-sectional view taken on line 7—7 of FIG. 3.

The rotatable table 12 is adapted to be indexed from the testing station 46 to a position over an open end 48 of a chute 49 that permits the items 24 that pass the inspection at the stations 43 and 46 to be passed from the table 12 down along the chute wall 50 into the compartment line or portion 51 that leads to a tested and accepted supply of items 24 while those that have been rejected as defective at stations 43 and 46 will be directed by the chute flap 52 having been moved by a piston and cylinder arrangement 53 to the dotted line position illustrated in FIG. 7 into the reject portion 54 of the chute 49 so as to be separated from the accepted items 24 in a manner hereinafter described. The items 24 leave the notches 41 of the table 12 by centrifugal force as the table 12 is indexed over the chute 49 because the hold member 12A terminates short of the chute 49.

Thus, it can be seen that, in general, the apparatus and method 10 of this invention is adapted to separate individual items 24 from supply thereof disposed in the hopper means 17 and cause the same to pass from the hopper means 17 down the track 19 to the table 12. However, as the items 24 pass down the track 19, the same are subjected to testing by devices 28 and 35, 36 so that those items 24 that have the height of the heads 25 thereof longer than the acceptable maximum length thereof and/or have the shank portions 23 thereof longer than the acceptable maximum length thereof are rejected by the air nozzle 29 into the reject chamber 34 before the same reach the table 12. The table 12 is indexed in a counterclockwise direction in FIG. 3 to serially receive the items 24 at the end 37 of the track 19 and when a particular notch 41 brings its received item 24 to the station 43, the device 44 tests the same not only for the maximum overall length of the item 24, but also for the maximum OD of the head 25 thereof and the depth and the configuration of the slot in the head 25 if such item 24 has a particular configured slot in the head 25 thereof. The testing device 45 at the station 43 also is utilized and is adapted to test the shank portion 23 to determine if the diameter there falls within the acceptable minimum and maximum diameter for such item 24, which test, of course, determines whether there are any threads on the shank portion 23 should the item 24 be a screw. The testing devices 44 and 45 through an electrical circuit hereinafter described, as well as through a memory bank hereinafter described, are adapted to cause the damper 52 in the chute 49 to reject such item 24 when the same reaches the open end 48 of the chute 49 should such item 24 not pass any of the tests provided by the devices 44 and 45.

Similarly, the device 47 at the station 46 is adapted to test the overall length of the item 24 to determine overall minimum length for the item 24 so that if the same does not pass such test by being too short, the testing device 47 through the memory bank, etc., will cause the damper 52 to reject such item 24 down the chute portion 54 when such defective item 24 reaches the open end 48 of the chute 49.

The particular details of the table 12 and testing devices 44, 45 and 47 will now be described.

Figure 5:
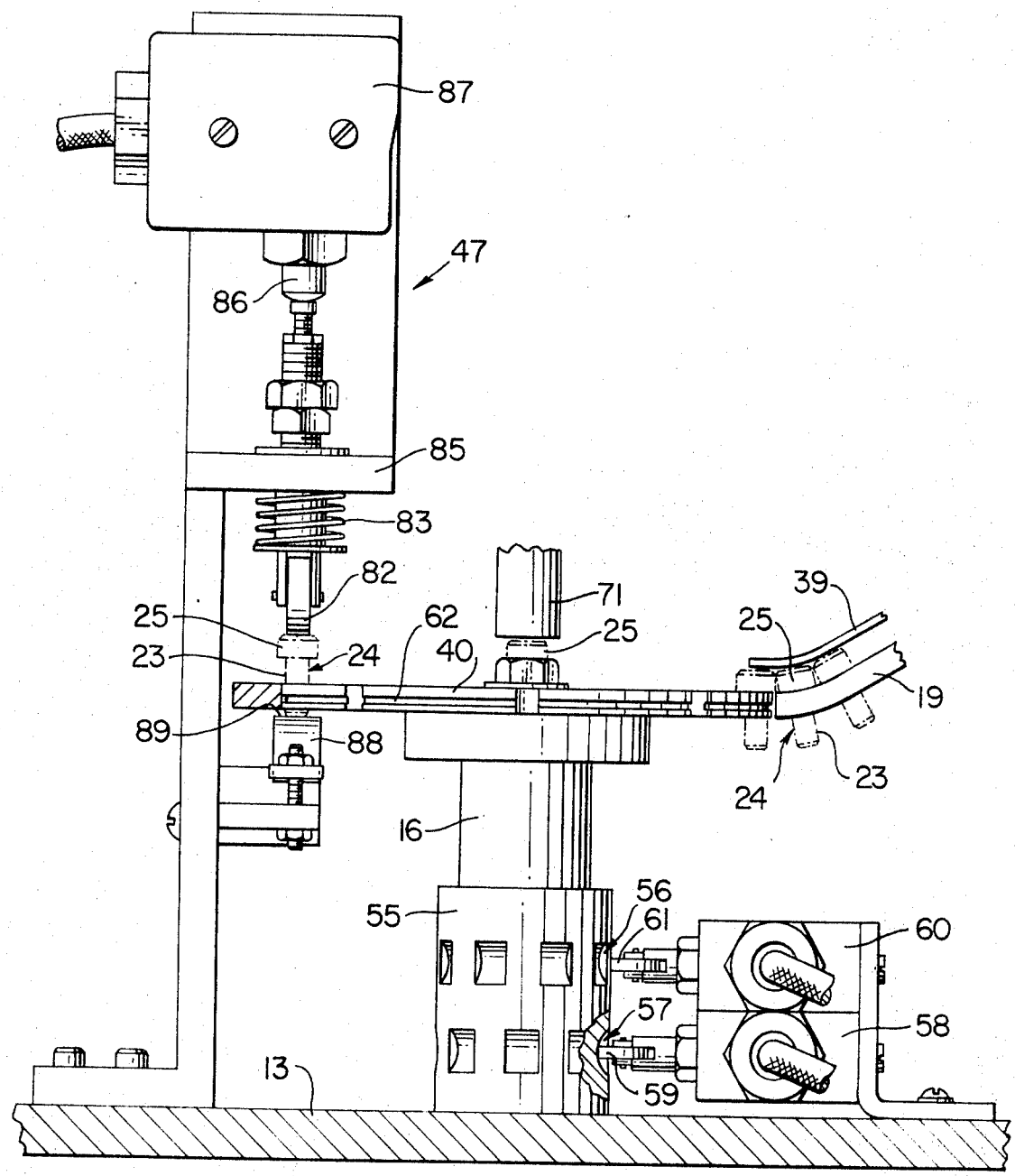
FIG. 5 is a fragmentary, cross-sectional view taken on line 5—5 of FIG. 4.

The rotatable table 12 has a member 55 on the drive shaft 16 thereof which is provided with one row of circumferentially arranged recesses 56 and another row of circumferentially arranged recesses 57 disposed below and in offset relation to the recesses 56. As illustrated in FIG. 5, a limit switch 58 has its plunger actuator 59 or follower received in a recess 57 in the lower row of recesses 57 when the notches 41 of the table 12 are disposed in the position of FIG. 3 so that three notches 41 are respectively in alignment with the end 37 of the track 19, with the testing devices 44 and 45 at the station 43 and with the testing device at the station 46. An upper limit switch 60 has its plunger operating roller or follower 61 only received in a recess 56 of the upper row of recesses in the member 55 when the notches 41 are out of alignment with the stations 46, 43 and the end 37 of the chute 19 whereby the limit switches 58 and 60 control the operation of the testing devices 44, 45 and 47 only when the table 12 has indexed items 24 to the testing stations 43 and 46 and is in a dwell period as will be apparent hereinafter.

The table 12 has a circumferential groove 62 formed in the outer periphery 40 thereof with such groove 62 intersecting with the notches 41 thereof, the groove 62 being adapted to receive a measuring shim or gage 63 of the testing device 44 in a manner hereinafter described.

Figure 6:
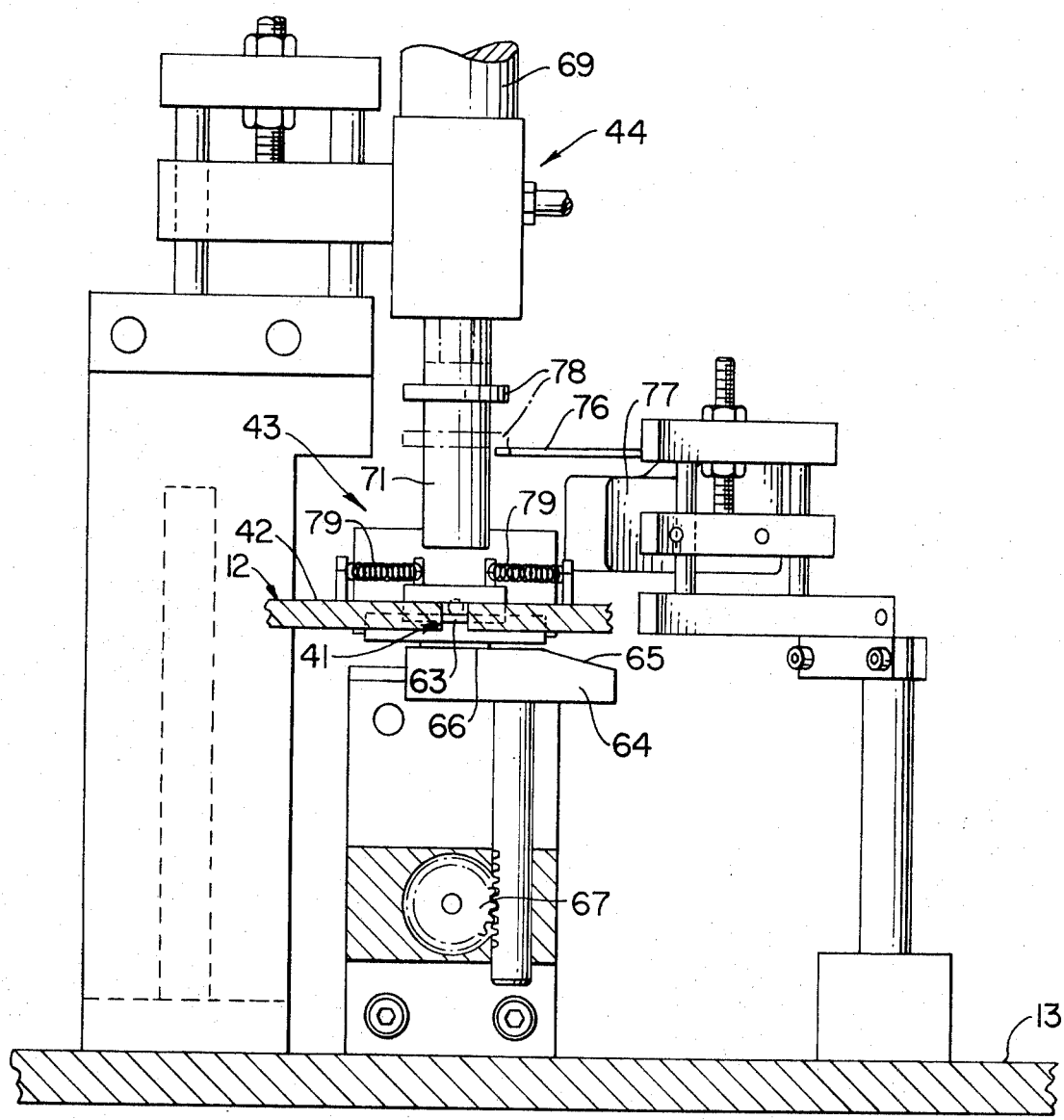
FIG. 6 is a fragmentary, cross-sectional view taken on line 6—6 of FIG. 4.

The testing device 44 is best illustrated in FIGS. 4 and 6 and includes a cam member 64 disposed below the rotatable table 12 and having its camming surface 65 disposed in alignment with the notches 41 in the table 12 so that as the table 12 rotates an item 24 over the cam surface 65 to bring that item 24 to the testing station 43, the same acts against the lower end of the shank 23 of the item 24 to move and raise the item 24 upwardly relative to the table 12 until the item 24 reaches the flat upper portion 66 of the cam member 64 as illustrated in FIG. 4 where the head 25 of the item 24 is now no longer supported on the top 42 of the table 12. Of course, the cam member 64 is set at the predetermined position thereof for the surface 66 by any suitable adjusting mechanism, such as the gear train arrangement 67 illustrated in FIG. 6 and controlled by a hand knob 68 as illustrated in FIG. 4.

The testing device 44 includes a piston and cylinder arrangement 69 carried by the frame means 11 and having the piston rod thereof 70 carry a gaging head or probe 71 for acting on the head 25 of the item 24 at the station 43. The probe or head 71 of the testing device 44 has a recess 72 formed in the lower end 73 thereof with such recess 72 having a diameter which is the maximum diameter that is acceptable for the diameter of the head 25 of an item 24. The end surface 74 of the recess 72 in the probe head 71 is to be at a height above the surface 66 of the cam 64 when the same is compacted against the head 25 of an item 24 at no greater distance than the maximum acceptable overall length of the item 24 being tested thereby as will be apparent hereinafter. The probe 71 also carries an adjustable and replaceable part 75 which will be the minimum acceptable slot distance within the head 25 of an item 24 and the end 75 below the surface 74 can be of the desired configuration for the acceptable slot configuration in the head 25 of the item 24.

Thus, it can be seen that when the probe 71 is lowered onto the head 25 of item 24 at the station 43 the same must be able to move downwardly over the head 25 until the surface 74 abuts against the head 25 of the item 24 and if the probe 71 has been lowered to a position so that the same senses an item 24 having the overall length thereof of less than the maximum acceptable overall length, the probe 71 will have been lowered a sufficient distance to actuate the arm 76 of a limit switch 77 which will indicate that the item 24 being tested by the probe 71 is acceptable, not only in the overall length thereof, but also in that the diameter of the head 25 is not too large and that the slot in the head is at least of a minimum depth and of the correct configuration because if this were not true the probe 71 could not be lowered a sufficient distance to cause its flange 78 to actuate the switch arm 76 of the switch 77. However, if the limit switch 77 does not have the arm 76 thereof actuated by the collar part 78 of the probe 71 engaging against the same, then it is either because the end 75 cannot fit within the slot of the head 25 of the item 24, the probe recess 72 cannot go over the head 25 of the item 24 because the head 25 has an outside diameter greater than the acceptable maximum diameter, or the overall length of the item 24 is greater than the acceptable maximum overall length thereof because the surface 74 has bottomed out against the too long item 24 so that the collar 78 cannot actuate the switch arm 76 of the switch 77. Such non-actuation of the switch 77 is a signal that is stored in a memory bank so that when that particular item 24 is subsequently indexed to the open end 48 of the chute 49, that defective item 24 will be directed into the reject portion 54 of the chute 49 in a manner hereinafter described by the gate 52.

While the item 24 is at the station 43 being tested by the device 44 in the above manner, the item 24 is also being tested by the device 45 which has the gage or shim 63 thereof received in the slot 62 of the table 12 and is moved inwardly or outwardly in the slot 62 as determined by the diameter of the shank portion 23 of the item 24 at the station 43. The shim or gage 63 is normally urged inwardly to the full depth of the groove 62 by tension springs 79. The gage 63 is attached to the plunger 80 of a limit switch 81 which will be actuated to a defective part signal condition if the shim 63 moves into the slot 62 to too great an extent and thereby indicates that the diameter of the particular shank portion 23 of the item 24 is smaller than the minimum acceptable diameter. Conversely, should the shim 63 be forced outwardly by the diameter of the shank portion 23 of the item 24 a distance greater than the acceptable maximum diameter setting of the switch 81, the switch 81 will also be actuated to a defective part signal condition so that when that particular item 24 is indexed to the chute 49, the same will be rejected down the reject portion 54 thereof as having a shank portion 23 that is outside of the acceptable minimum or maximum diameter thereof, such as would be the case should the shank portion 23 not be threaded when the same should have been threaded.

As illustrated in FIGS. 5 and 7, the testing device 47 includes a roller means 82 adapted to engage against the head 25 of an item 24 disposed at the testing station 46, the roller 82 being normally urged downwardly by a compression spring 83 and being movable relative to a bracket 85 carrying the same. A stem portion of the roller assembly 82 is followed by the plunger 86 of a limit switch 87 also carried by the bracket 85. In this manner, should the roller 82 move downwardly to too great an extent caused by a too short item 24 being tested at the station 46, the plunger 86 of the switch 87 will also be moved downwardly thereby in following such movement so that the switch 87 will be actuated to a defective part signal condition to indicate that the item 24 is too short, i.e., has an overall length smaller than the acceptable minimum overall length of the item 24.

As illustrated in FIGS. 5 and 7, the item 24 when at the station 46 is cammed upwardly by an adjustable cam member 88 acting on the lower end of the shank portion 23 of the item 24 so that if the distance between the upper part 89 of the cam 88 and the lower end of the roller 82 is such that the same is greater than the acceptable minimum overall length of the item 24, the switch 87 is not actuated by the plunger 86 and it is only when the item 24 being tested causes the distance between the upper portion 89 of the cam 88 and the lower portion of the roller 82 to be less than the acceptable overall minimum length for the item 24 that the switch 87 is actuated to cause a memory bank to operate the piston and cylinder arrangement 53 for the damper 52 to reject such rejected item 24 down the chute portion 54 in a manner hereinafter described.

Therefore, it can be seen that the various testing devices disposed about the table 12 automatically and serially operate on the items 24 to test the same as the items 24 are moved by the table 12 so that when the items 24 reach the chute 49, only the acceptable items are permitted to pass down the chute portion 51 while the unacceptable items are caused to pass down the chute portion 54 so that the good items 24 are separated from the bad items 24 by the method and apparatus 10 of this invention in the above manner.

Figure 8:
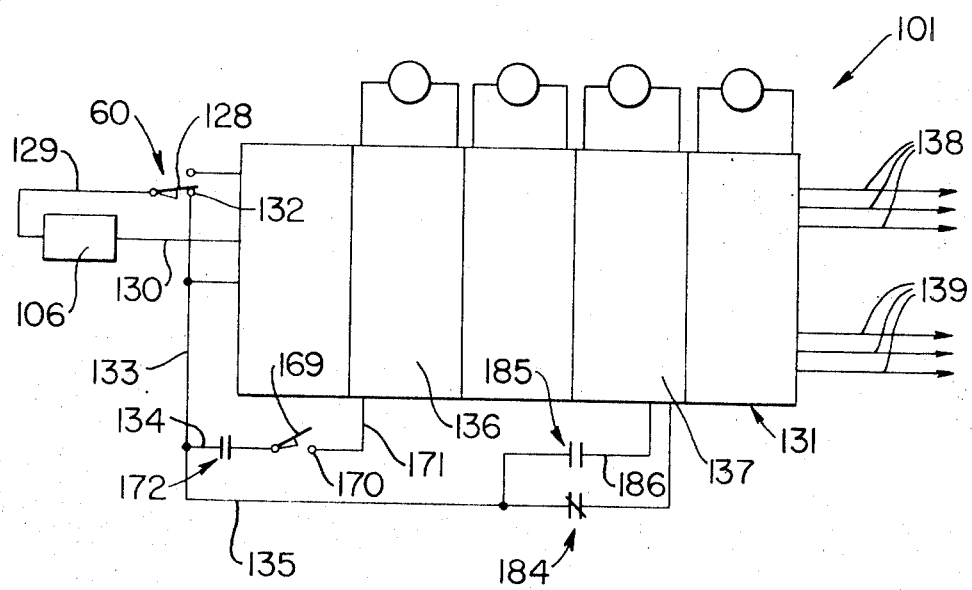
FIG. 8 is a schematic view illustrating the memory bank of the electrical circuit for the testing apparatus of FIG. 1.
Figure 9:
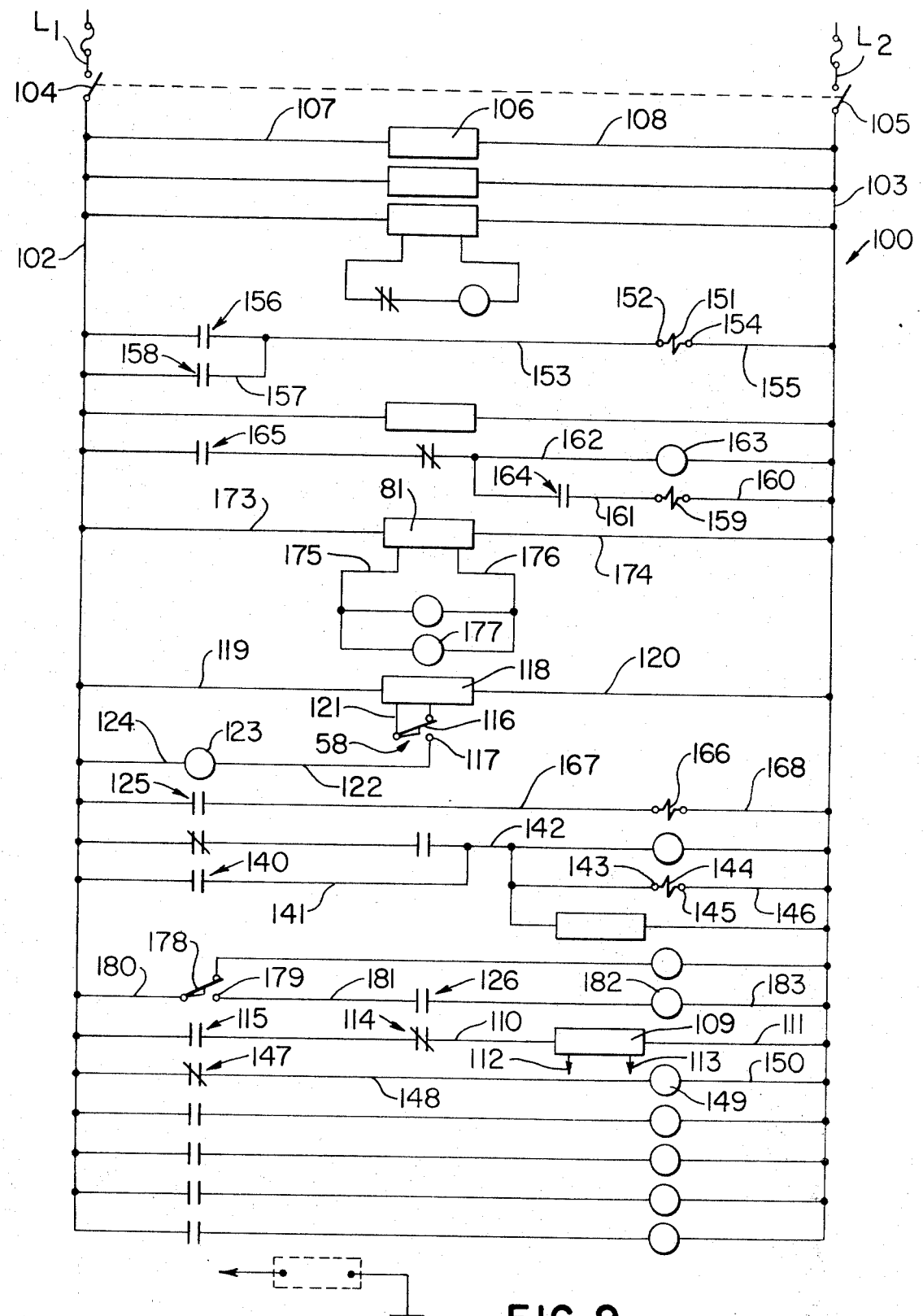
FIG. 9 is an electrical diagram illustrating schematically the electrical circuit for the testing apparatus of FIG. 1.

While it is obvious from the description of applicant's method and apparatus 10 as set forth above that any suitable electrical and pneumatic arrangement can be provided for the apparatus 10 to cause the same to accomplish the above automatic testing and sorting operation, the particular electrical system for the apparatus 10 is generally indicated by the reference numeral 100 in FIG. 9 and the particular memory bank circuit for the apparatus 10 is generally indicated by the reference numeral 101 in FIG. 8 whereby such circuits 100 and 101 and the operation thereof will now be described.

As illustrated in FIG. 9, the electrical circuit 100 includes a pair of fused power source lines L1 and L2 adapted to be respectively interconnected to main leads 102 and 103 of the circuit 100 when the apparatus 10 is turned on by having main switches 104 and 105 for the leads 102 and 103 closed against the power source leads L1 and L2. When the switch blades 104 and 105 are moved to the "on" or closed position thereof against the power source leads L1 and 12, a power supply transformer 106 is energized as the same is placed across the now energized leads 102 and 103 by leads 107 and 108, the voltage supply 106 being adapted to supply voltage to the memory bank 101 as illustrated in FIG. 8 in the manner hereinafter described.

A second voltage supply device or transformer 109 is also placed across the leads 102 and 103 by leads 110 and 111 when the switches 104 and 105 are closed, the power supply 109 providing its electrical power through output leads 112 and 113 to the main drive motor 14 for the apparatus 10 for operating the table 12 in the manner previously described. However, the lead 110 has a normally closed relay operated switch 114 therein that is only opened if too many items 24 are being rejected by the testing apparatus 10 through the operation of the piston and arrangement 53 as will be apparent hereinafter. The line 110 also has a normally open pressure operated electrical switch 115 disposed therein that is only closed when there is sufficient operating pressure to operate the various piston and cylinder arrangements of the apparatus 10. Thus, as long as there is sufficient operating pressure, the switch 115 is closed and as long as there are not too many bad items 24 being rejected by the apparatus 10 at the table 12 thereof, the switch 114 remains closed so that the power supply 109 for the main motor 14 continuously supplies electrical power to the motor 14 to continuously index the table 12.

It is to be understood that while the motor 14 is continuously operating, the transmission means 15 for the shaft 16 for the table 12 indexes the table 12 between the various increments of movement thereof while providing dwell time after each particular increment of movement of the table 12 in a normal intermittent indexing manner so that testing of the items 24 can take place while the table 12 is in a dwell period thereof.

The limit switch 58 has the switch blade 116 thereof moved from the position illustrated in FIG. 9 against a contact 117 whenever the follower 59 of the limit switch 58 is disposed within a recess 57 of the shaft means 16 to indicate that the table 12 is in a dwell position thereof so that items 24 at the stations 43 and 46 can now be tested. However, when the table 12 is rotating so that the follower 59 is out of a recess 57, the follower 59 causes the switch blade 116 of the limit switch 58 to be in the full line position illustrated in FIG. 9 with the blade 116 out of contact with the contact 117.

As illustrated in FIG. 9, a pulsing power supply means 118 is placed across the power leads 102 and 103 by leads 119 and 120 and has an output lead 121 interconnected to the switch blade 116 whereby the pulsing power supply 118 is adapted to send a pulsing current through the lead 121 which will be directed to the contact 117 when the switch blade 116 is against the contact 117 and such position of the switch blade 116 only occurs when the table 12 is in a dwell position and the items 24 are located at the stations 43 and 46 for testing thereof.

The contact 117 is interconnected by a lead 122 to one side of a relay 123 while the other side of the realy 123 is interconnected by a lead 123 to the power source lead 102. The relay 123, when energized by the pulsing power supply 118 when the switch blade 116 is against the contact 117, is adapted to close normally open relay switch 125 and normally open relay switch 126 for a purpose hereinafter described.

Since the memory bank circuit 101 is only to be energized from the power supply 106 during the testing operation which takes place when the table 12 is in a dwell position thereof, the limit switch 60 has its switch blade 128, FIG. 8, interconnected by a lead 129 to one side of the power supply 106 while the other side of the power supply 106 is interconnected by a lead 130 to the memory bank 131 which can only be energized when the other power source lead 129 is interconnected thereto by the switch blade 128. As illustrated in FIG. 8, the switch blade 128 is adapted to be disposed against a contact 132 which, in turn, is interconnected by a lead 133 to leads 134 and 135 for respectively supplying electrical current to the parts 136 and 137 of the memory bank 131. The switch blade 128 of the limit switch 60 is only against the contact 132 when the follower 61 thereof is cammed out of the recesses 56 in the manner illustrated in FIG. 5 and such condition occurs only when the table 12 is in its dwell position. However, when the table 12 is being rotated, the cam follower 61 is disposed in a recess 56 and thereby causes the switch blade 128 to move away from the contact 132 to prevent the memory bank 131 from being energized during such movement of the table 12.

The memory bank part 136 will cause the air cylinder 53 to reject an item 24 when the same reaches the open end 48 of the chute 49 if that particular item 24 has dimensions that fall outside of the required limits as being tested by the testing devices 44 and 45 at the station 43. The memory bank part 137 will cause the air cylinder 53 to reject an item 24 when the same reaches the open end 48 of the chute 49 should that particular item 24 while being tested at the station 46 have dimensions falling outside of the required limits of the testing device 47.

In particular, if either part 136 or 137 of the bank 131 has received a signal that a bad item 24 has been detected when it was respectively at the stations 43 and 46, the memory bank 131 will provide an electrical output at the output lines 138 and 139 thereof, whereas if neither bank part 136 or 137 detected a reject signal from the work stations 43 and 46, an electrical output would then not be provided at the output lines 138 and 139.

Since the piston and cylinder arrangement 53 is normally disposed in the deenergized position illustrated in FIG. 7 so that items 24 entering the chute 49 will pass down the good part 51 thereof, as long as no electrical output is provided from the memory bank 131 through the output lines 138 and 139 when a particular item 24 reaches the open end 48 of the chute 49, the item 24 will be thrown out of its respective notch by centrifugal force, as the same has now cleared the restraining rail 12A that maintains the items 24 within the notches 41 as the notches 41 move from the end 37 of the track 19 past the station 46 to the chute 49, and will fall down the chute 49 into the good portion 51 thereof.

However, should the memory bank 131 provide the electrical output signal at the lines 138 and 139 that a bad item 24 is now being moved toward the open end 48 of the chute 49, the electrical impulse in the lines 138 causes a switch 140 of the circuit 100 to close and interconnect a lead 141 from the power source lead 102 to a lead 142 that is interconnected to one side 143 of an electrically operated valve 144 which when energized will operate the piston and cylinder arrangement 53 of the sensing device 44 to cause the gate 52 of the chute 48 to move from the full line position illustrated in FIG. 7 to the dotted line position illustrated in FIG. 7 so that the particular defective item 24 now being moved over the open end 48 of the chute 49 will be directed down the reject portion 54 thereof. The other side 145 of such electrically operated valve means 144 is interconnected by a lead 146 to the power source lead 103.

Such reject signal from the memory bank 131 also being provided in the leads 139 thereof will cause opening of a normally closed electrical switch 147 disposed in a lead 148 leading from the power source lead 102 to one side of a timer 149 that has the other side thereof interconnected by lead 150 to the power source lead 103. Such opening of the switch 147 causes the timer 149 to affect the previously described normally closed switch 114 in the line 110 leading to the main power supply 109 for the drive motor 14 so that if the timer 149 has its switch 147 opened too many times in any one certain period of time of operation of the apparatus 10, the switch 114 will be opened to terminate the operation of the apparatus 10 so that the operator can determine just what is the problem, i.e., whether the items 24 being rejected are actually bad or whether one of the testing devices has failed so that it is rejecting good items 24.

Another electrically operated valve means 151 is provided for operating the air reject nozzle 29 at the upper end of the track 19 so that when the valve means 151 is energized, the same will direct a blast of air upwardly to reject that particular item 24 passing over the nozzle 29 in the manner previously described.

One side 152 of the electrically operated valve means 151 is interconnected by a lead 153 to the power source lead 102 and the other side 154 of the valve means 151 is interconnected by a lead 155 to the power source lead 103. However, lead 153 has a normally opened switch 156 disposed therein which is only closed when the head 25 of an item 24 is too tall and makes contact with the contact wiper 28 so that the valve means 151 will be energized to direct air out of the nozzle 29.

A lead 157 has one end interconnected to the power source lead 102 and the other end interconnected to the lead 153 to the left of the valve means 151 with the lead 157 having a normally open switch 158 disposed therein. The switch 158 is closed when the photocell sensors 34, 35 at the upper end of the track 19 sense that the shank portion 23 of an item 24 is too long whereby the air nozzle 29 will be operated by the valve means 151 being placed across the power source leads 102 and 103.

The means for operating the hopper bowl 17 comprises a normally opened electrically operated valve means 159 that has one side thereof interconnected by lead 160 to the power lead 103 while the other side is interconnected by a lead 161 to a lead 162 extending across the power source leads 102 and 103. The lead 162 has a timer 163 disposed therein intermediate the power source lead 103 and the lead 161 and when the timer 163 is energized, the timer 163 is adapted to close a normally open switch 164 in the lead 161 to the left of the electrically operated valve 159. The lead 162 to the left of its juncture with lead 161 has a normally opened switch 165 therein which only closes when the photocell sensor assembly 38 senses that the track 19 has been filled up by items 24 in advance of the table 12 to too high an extent so that such closing of the switch 165 causes the timer 163 to close the switch 164 and cause the valve means 159 to terminate the operation of the hopper bowl 17 until the sensor 38 again opens the switch 165 whereby the valve means 59 controls the hopper 17.

An electrically operated valve means 166 is provided for directing pneumatic fluid to the piston and cylinder arrangement 69 for the testing device 44 to cause the probe 71 to move downwardly to telescope over the head 25 of the item 24 at station 43 to test the same. The valve means 166 has the left side thereof interconnected by a lead 167 to the power source lead 102 with the lead 167 having the normally opened switch 125 therein that is controlled by the relay 123. The other side of the electrically operated switch 166 is interconnected by a lead 168 to the power source lead 103. Thus, when the switch blade 116 of the limit switch 58 moves downwardly against the contact 117 upon the table 12 having indexed items 24 to the stations 43 and 46, the relay 123 is placed across the power source leads 102 and 103 and causes the switch 125 to close so that the valve means 166 is now placed across the leads 102 and 103 to move the probe 71 downwardly to test the item 24 at the station 43. Should the item 24 at the station 43 be a good item so that the probe 71 has moved downwardly the required distance to have an arm or flange 78 thereof operate the arm 76 of the limit switch 77, such closing of the switch 77 causes its switch arm 169, FIG. 8, to close against a contact 170 interconnected by a lead 171 to the memory bank part 136. The switch arm 169 of the limit switch 77 is interconnected to the lead 134 coming from the power source 106. In this manner, the memory bank 136, if it does not receive an electrical signal through the lead 171, will cause the cylinder 53 to reject that particular item 24 when it reaches the chute 49.

A normally open switch 172 is also disposed in the lead 134 which is closed only if the testing device 45 or switch 81 thereof is sensing a diameter of the shank portion 23 of the item 24 within the required minimum and maximum diameter range thereof. Thus, it can be seen that it requires both switches 77 and 81 to be actuated to the proper condition thereof in order for a signal to be directed to the memory bank part 136 through the lead 134 to indicate that the item 24 now being tested at station 43 is proper and that when the same reaches the hopper 48, the gate 52 will not be actuated so that the same will go down the good side 51 of the chute 49.

In order to close the switch 172 under the control of the limit switch 81, the switch 81 has one side thereof interconnected by a lead 173 to the lead 102 and the other side interconnected by a lead 174 to the lead 103 with the sensor 81 having its output leads 175 and 176 respectively interconnected to both sides of a relay 177 which when energized causes the closing of the switch 172. Thus, the relay 177 is only energized when the gage or shim 63 is sensing a shank portion 23 of an item 24 which is within the acceptable minimum and maximum diameter range of the testing device 45.

The switch 87 of the testing device 47 for testing for whether the item 24 at the station 46 has an overall length that is too short, has its switch blade 178 only movable against a contact 179 when the follower 82 moves downwardly to a point where the item 24 disposed between the follower 82 and the cam 89 is too short so that the blade 179 will interconnect the power source lead 102 through a lead 180 to a lead 181 having the normally opened switch 126 therein and is interconnected to one side of a relay 182 that has its other side interconnected by a lead 183 to the power source lead 103. As previously stated, the switch 126 is closed when the table 12 is in its dwell position by the relay 123 being energized so that if the item 24 at the station 46 is too short, the switch blade 178 closes against the contact 179 and causes the relay 182 to be energized which opens a normally closed switch 184 in the lead 135 leading to the memory bank part 137 and closes a normally opened switch 185 in a lead 186 also leading to the part 137 of the memory bank 131 so that such opening of the switch 184 and the closing of the switch 185 causes the memory bank 137 to produce an output in the lines 138 and 139 when that particular item 24 is over the open end 48 of the chute 49. Thus, the piston and cylinder 53 is energized in the manner previously described so that the gate 52 will be moved to its dotted line position illustrated in FIG. 7 to cause the item 24 to be rejected down the bad side 54 of the chute 49.

Thus, it can be seen that from the above description of the electrical circuit 100 and memory bank circuit 101 of the apparatus 10 of this invention, the items 24 are adapted to be automatically fed down the track 19 to the table 12 and be indexed by the table 12 to the testing stations 43 and 46 to be tested by the devices 44, 45, and 47 with such items 24 having been previously tested for its head height and shank length in the track 19 so that only those items 24 falling within the acceptable range will be received in the good part 51 of the chute 49 while those that have reached the table 12, but do not pass the test of the testing devices 44, 45, and 47 at the table 12 will be directed down the bad portion 54 of the chute 49.

In particular, as an item 24 is being directed from the hopper 17 into the upper end of the track 19, the electrically operated valve 151 will only be energized to operate the nozzle 19 to eject such item 24 if its head 25 is too long by the contact wiper 28 closing the switch 126 or if its shank portion 23 is too long so that the photo cell arrangement 35, 36 causes closing of the switch 158.

When such item 24 has been received by the table 12 and indexed to the station 43, the downward movement of the probe 71 will actuate switch 77 so that its switch blade 169 can close against the contact 170 of the memory bank circuit 101 if the item 24 is good. Also, the switch 81 of the testing device 45 will cause closing of the switch 172 of the memory bank 101 through the energizing of the relay 177 if the shank portion 23 is within the acceptable diameter range.

The closing of the switch 172 and switch blade 169 for the memory circuit bank part 136 will cause that item 24, if it passes the test at the station 46, to be directed down the good side 51 of the chute 49.

When such item 24 is subsequently moved by the table 12 to the station 46, and the same is not too short, the switch 87 does not have its blade 178 moved against the contact 179 so that the relay 182 will not close the open switch 185 and open the closed switch 184 for the memory bank part 137 so that the memory bank part 137 will not cause an output signal at the lines 138 and 139 to cause a rejection of that item 24 when the same reaches the chute 49.

Therefore, it can be seen that this invention not only provides an improved testing and sorting apparatus, but also this invention provides an improved method of automatically testing and sorting screw-like items or the like.

While the form of the invention now preferred has been disclosed as required by the patent statutes, other forms may be utilized, all coming within the scope of the appended claims.

What is claimed is:

1. Apparatus for automatically and serially testing screw or rivet items each having a head and a shank portion comprising frame means, a rotatable table means carried by said frame means for serially moving said items through a plurality of testing stations of said apparatus, and a plurality of testing devices carried by said frame means so as to be located adjacent said table means and respectively at said stations to test said items as said table means moves the same respectively to the stations where said devices are located, one of said devices having means for testing for maximum overall length of said items, another of said devices having means for testing for minimum overall length of said items, said table means having a plurality of opening means into which said shank portions of said items are received so that the heads thereof can rest against said table means during the movement thereof through said apparatus by said table means, said one and said other testing devices each having means for raising said items relative to said table means so that said heads thereof are spaced from said table means during the testing thereof by the respective device and for thereafter lowering said items to said table means so that the heads thereof can again rest against said table means during subsequent movement of said table means.

2. Apparatus as set forth in claim 1 wherein hopper means is carried by said frame means for serially feeding said items from a supply thereof to said table means.

3. Apparatus as set forth in claim 2 wherein said hopper means has means for separating out items that are generally too long in shank length thereof before said items reach said table means.

4. Apparatus as set forth in claim 2 wherein said hopper means has means for separating out items that are generally too long in head height thereof before said items reach said table means.

5. Apparatus as set forth in claim 1 wherein another of said devices has means for testing for maximum and minimum diameter of said shank portions of said items.

6. Apparatus as set forth in claim 1 wherein another of said devices has means for testing for maximum diameter of said heads of said items.

7. Apparatus as set forth in claim 1 wherein said table means has an outer circular periphery, said table means having a plurality of radially disposed notches formed in said periphery thereof defining said opening means for respectively receiving said shank portions of said items for carrying said items therewith.

8. Apparatus for automatically and serially testing screw or rivet items each having a head and a shank portion comprising frame means, a rotatable table means carried by said frame means for serially moving said items through a plurality of testing stations of said apparatus, and a plurality of testing devices carried by said frame means so as to be located adjacent said table means and respectively at said stations to test said items as said table means moves the same respectively to the stations where said devices are located, one of said devices having means for testing for maximum overall length of said items, another of said devices having means for testing for minimum overall length of said items, another of said devices having means for testing for slot configuration in the heads of said items when said items are screw-like items.

9. A method for automatically and serially testing screw or rivet items each having a head and a shank portion comprising the steps of serially disposing said items on a rotatable table means carried by a frame means for serially moving said items through a plurality of testing stations, testing for maximum overall length of said items with one testing device at one of said testing stations, and testing for minimum overall length of said items with another testing device at another of said testing stations, said step of disposing said items on said rotatable table means comprising the step of serially disposing the shank portions of said items into a plurality of opening means in said table means so that the heads thereof can rest against said table means during the movement thereof by said table means, said testing steps each including the steps of raising said items relative to said table means so that said heads thereof are spaced from said table means during the testing thereof by the respective testing device and thereafter lowering said items to said table means so that said heads thereof can again rest against said table means during subsequent movement of said table means.

10. A method as set forth in claim 9 and including the step of serially feeding said items from a supply thereof in a hopper means to said table means.

11. A method as set forth in claim 10 and including the step of separating out items that are generally too long in shank length thereof before said items reach said table means.

12. A method as set forth in claim 10 and including the step of separating out items that are generally too long in head height thereof before said items reach said table means.

13. A method as set forth in claim 9 and including the steps of testing for maximum and minimum diameter of said shank portions of said items with another testing device.

14. A method as set forth in claim 9 and including the step of testing for maximum diameter of said heads of said items with another testing device.

15. A method as set forth in claim 9 wherein said table means has an outer circular periphery and has a plurality of radially disposed notches formed in said periphery thereof and respectively defining said opening means, said step of disposing said items on said table means comprises the step of disposing said shank portions of said items in said notches of said table means.

16. A method for automatically and serially testing screw or rivet items each having a head and a shank portion comprising the steps of serially disposing said items on a rotatable table means carried by a frame means for serially moving said items through a plurality of testing stations, testing for maximum overall length of said items with one testing device at one of said testing stations, testing for minimum overall length of said items with another testing device at another of said testing stations, and testing for slot configuration in the heads of said items when said items are screw-like items by another testing device.

* * * * *